(12) United States Patent
Suzuki et al.

(10) Patent No.: US 11,338,440 B2
(45) Date of Patent: May 24, 2022

(54) ROBOT SYSTEM AND CALIBRATION METHOD

(71) Applicant: Fanuc Corporation, Yamanashi (JP)

(72) Inventors: Hajime Suzuki, Yamanashi (JP); Shuusuke Watanabe, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 351 days.

(21) Appl. No.: 16/517,999

(22) Filed: Jul. 22, 2019

(65) Prior Publication Data
US 2020/0030984 A1    Jan. 30, 2020

(30) Foreign Application Priority Data
Jul. 30, 2018 (JP) .............................. JP2018-142560

(51) Int. Cl.
| | | |
|---|---|---|
| G05B 19/04 | (2006.01) | |
| G05B 19/18 | (2006.01) | |
| B25J 9/16 | (2006.01) | |
| B25J 15/00 | (2006.01) | |

(52) U.S. Cl.
CPC ........... *B25J 9/1692* (2013.01); *B25J 9/1697* (2013.01); *B25J 15/0019* (2013.01)

(58) Field of Classification Search
CPC ... H01L 51/00; H01L 51/006; H01L 51/0072; H01L 51/50; H01L 51/5012; A61K 8/0208; A61K 8/0212; B23K 26/02; B23K 26/032; B23K 26/14; B23K 26/702; B23K 9/32; A45D 44/002; A45D 44/22; G05B 2219/45165; B25J 15/0019; B25J 9/1692; B25J 9/1697
See application file for complete search history.

(56) References Cited

U.S. PATENT DOCUMENTS

| | | | |
|---|---|---|---|
| 5,533,146 A | | 7/1996 | Iwai |
| 6,044,308 A | * | 3/2000 | Huissoon ............... B25J 9/1692 700/166 |

(Continued)

FOREIGN PATENT DOCUMENTS

| | | |
|---|---|---|
| EP | 0532257 A2 | 3/1993 |
| EP | 1530107 A2 | 5/2005 |

(Continued)

OTHER PUBLICATIONS

Iwasaki, Yu; Notice of Reasons for Refusal; Japanese Patent Application No. 2018-142560; dated Sep. 1, 2020; 5 pages.

(Continued)

*Primary Examiner* — Harry Y Oh (57) ABSTRACT

This robot system includes a robot, a tool which is attached to the robot, an imaging device, and a controller which controls the robot and the tool, and the controller is configured so that a distal end portion of the robot is placed at a plurality of calibration positions, the tool is operated at each of the calibration positions, images of light irradiated to an object or a trace left on the object due to tool operation processing are captured by the imaging device, and calibration is performed based on comparison between irradiation positions of the light or positions of the traces, which are in an image captured by the imaging device, and predetermined reference positions.

6 Claims, 8 Drawing Sheets

(56) References Cited

U.S. PATENT DOCUMENTS

| | | | |
|---|---|---|---|
| 6,681,145 B1 * | 1/2004 | Greenwood | B25J 9/1692 |
| | | | 700/176 |
| 2005/0102060 A1 | 5/2005 | Watanabe et al. | |
| 2005/0159842 A1 | 7/2005 | Ban et al. | |
| 2006/0243708 A1 * | 11/2006 | Ikenoue | H01L 21/76831 |
| | | | 219/121.62 |
| 2007/0075048 A1 | 4/2007 | Kunisaki et al. | |
| 2017/0046977 A1 * | 2/2017 | Becker | G09B 19/003 |
| 2017/0266758 A1 * | 9/2017 | Fukui | B23K 26/36 |
| 2017/0361467 A1 | 12/2017 | Matsuura et al. | |
| 2017/0368649 A1 * | 12/2017 | Marrocco | B25J 9/1687 |
| 2018/0004188 A1 | 1/2018 | Yamaguchi et al. | |
| 2018/0178388 A1 | 6/2018 | Ishige et al. | |
| 2018/0297147 A1 * | 10/2018 | Nishikawa | B23K 26/364 |

FOREIGN PATENT DOCUMENTS

| | | |
|---|---|---|
| EP | 1555508 A1 | 7/2005 |
| EP | 3338969 A2 | 6/2018 |
| JP | H05-71932 A | 3/1993 |
| JP | H05-204423 A | 8/1993 |
| JP | H06-175712 A | 6/1994 |
| JP | H08-118272 A | 5/1996 |
| JP | 2001-235819 A | 8/2001 |
| JP | 2003-094187 A | 4/2003 |
| JP | 2004-042118 A | 2/2004 |
| JP | 2005-138223 A | 6/2005 |
| JP | 2006-082170 A | 3/2006 |
| JP | 2007-122705 A | 5/2007 |
| JP | 4021413 B2 | 12/2007 |
| JP | 2012-148302 A | 8/2012 |
| JP | 2016-078195 A | 5/2016 |
| JP | 2017-222001 A | 12/2017 |
| JP | 2018-001332 A | 1/2018 |
| JP | 2018-103352 A | 7/2018 |

OTHER PUBLICATIONS

Techno Search, Inc.; Search Report by Registered Search Organization; Japanese Patent Application No. 2018-142560; dated Jul. 9, 2020; 7 pages.

Iwasaki, Yu; Notice of Reasons for Refusal; Japanese Patent Application No. 2018-142560; dated Jan. 19, 2021; 5 pages.

* cited by examiner

ROBOT SYSTEM AND CALIBRATION METHOD

CROSS-REFERENCE TO RELATED APPLICATIONS

This application is based on and claims priority to Japanese Patent Application No. 2018-142560 filed on Jul. 30, 2018, the entire content of which is incorporated herein by reference.

TECHNICAL FIELD

This invention relates to a robot system and a calibration method.

BACKGROUND ART

A first patent document discloses an apparatus which performs calibration by using a calibration jig so as to correct distortion of a lens and the like of an imaging device. (See PTL 1, for example.)

CITATION LIST

Patent Literature

{PTL 1}
Japanese Patent Publication No. 4021413

SUMMARY OF INVENTION

A robot system according to a first aspect of the present invention includes a robot; a tool which is attached to a distal end portion of the robot; an imaging device which is attached to the robot or a predetermined support portion; and a controller which controls the robot and the tool; wherein, the controller performs: operation processing for calibration which arranges the distal end portion of the robot at a plurality of calibration positions; tool operation processing which operates the tool at each of the plurality of the calibration positions, imaging processing which causes the imaging device to capture light irradiated to a predetermined object or a trace left on the predetermined object in the tool operation processing, and, calibration processing which performs calibration based on comparison between irradiation positions of the light or positions of the traces, which are in an image captured by the imaging device, and predetermined reference positions.

A calibration method according to a second aspect of the present invention includes a calibration arrangement step which places a distal end portion of a robot, at which a tool is provided, at a plurality of calibration positions; a tool operation step which operates the tool at each of the plurality of the calibration positions; an imaging step which causes an imaging device to capture light irradiated to a predetermined object or a trace left on the predetermined object due to the tool operation step; and, a calibration step which performs calibration based on comparison between irradiation positions of the light or positions of the traces, which are in an image captured by the imaging device, and predetermined reference positions.

A calibration method according to a third aspect of the present invention includes a calibration arrangement step which places a distal end portion of a robot, at which a laser processing tool for performing a predetermined laser processing is attached, at a plurality of calibration positions; a tool operation step which causes the laser processing tool, at each of the plurality of the calibration positions, to radiate laser beam whose intensity is lower than that used for the predetermined laser processing; an imaging step which causes an imaging device to capture an image of the laser beam irradiated to a predetermined object due to the tool operation step; and a calibration step which performs calibration based on comparison between irradiation positions of the laser beam in the image captured by the imaging device and predetermined reference positions.

DESCRIPTION OF EMBODIMENTS

A robot system according to a first embodiment of the present invention will be described below with reference to the accompanying drawings.

Figure 1:
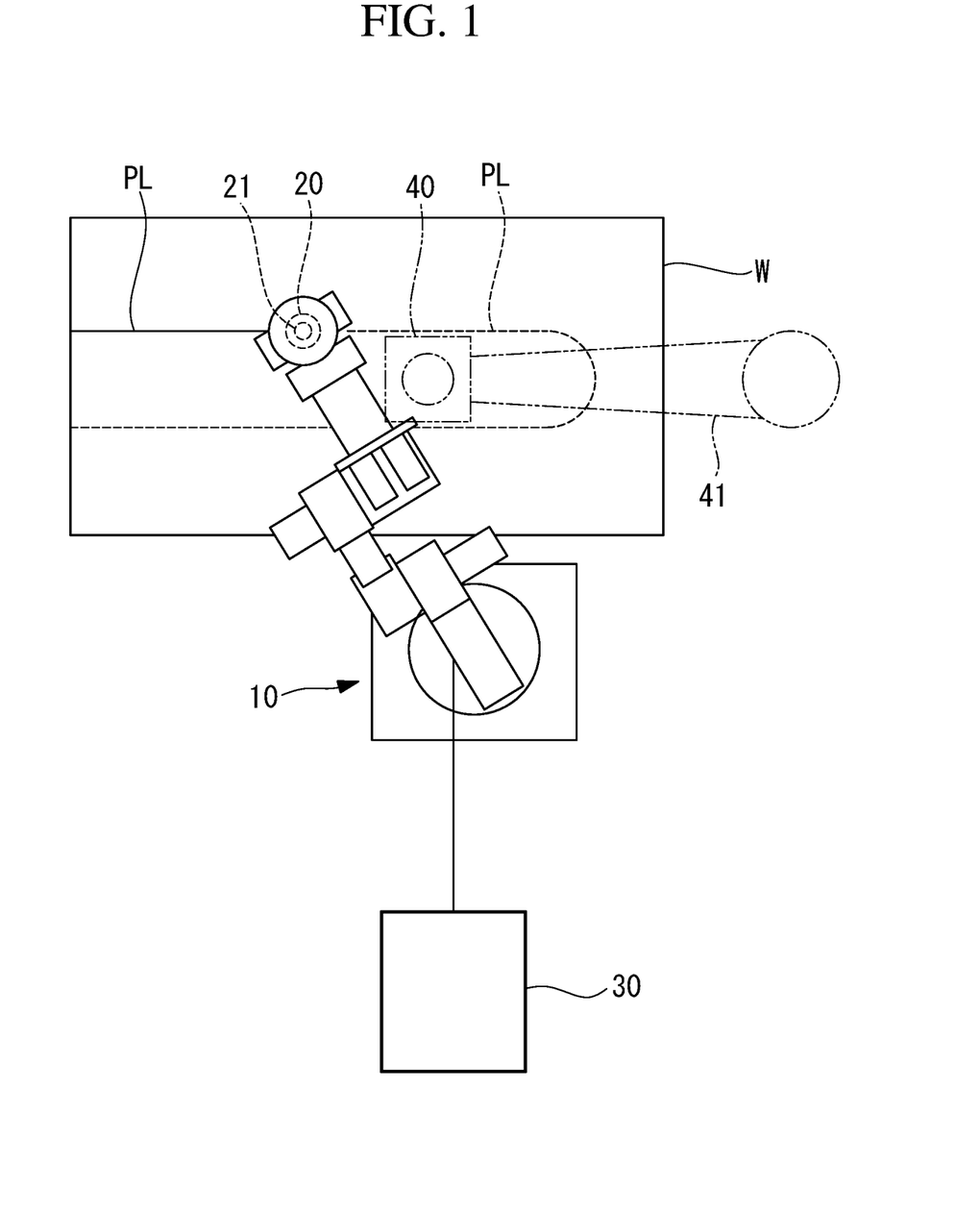
FIG. 1 is a schematic plan view of a robot system according to an embodiment of the present invention.

The robot system according to this embodiment includes a robot 10, a tool 20 which is attached at a distal end of the robot 10, a controller 30 which controls the robot 10 and the tool 20, and an imaging device 40 which is a two-dimensional camera, a three-dimensional camera, a three-dimensional distance sensor, or the like. The imaging device 40 is supported by a support member 41.

Figure 2:
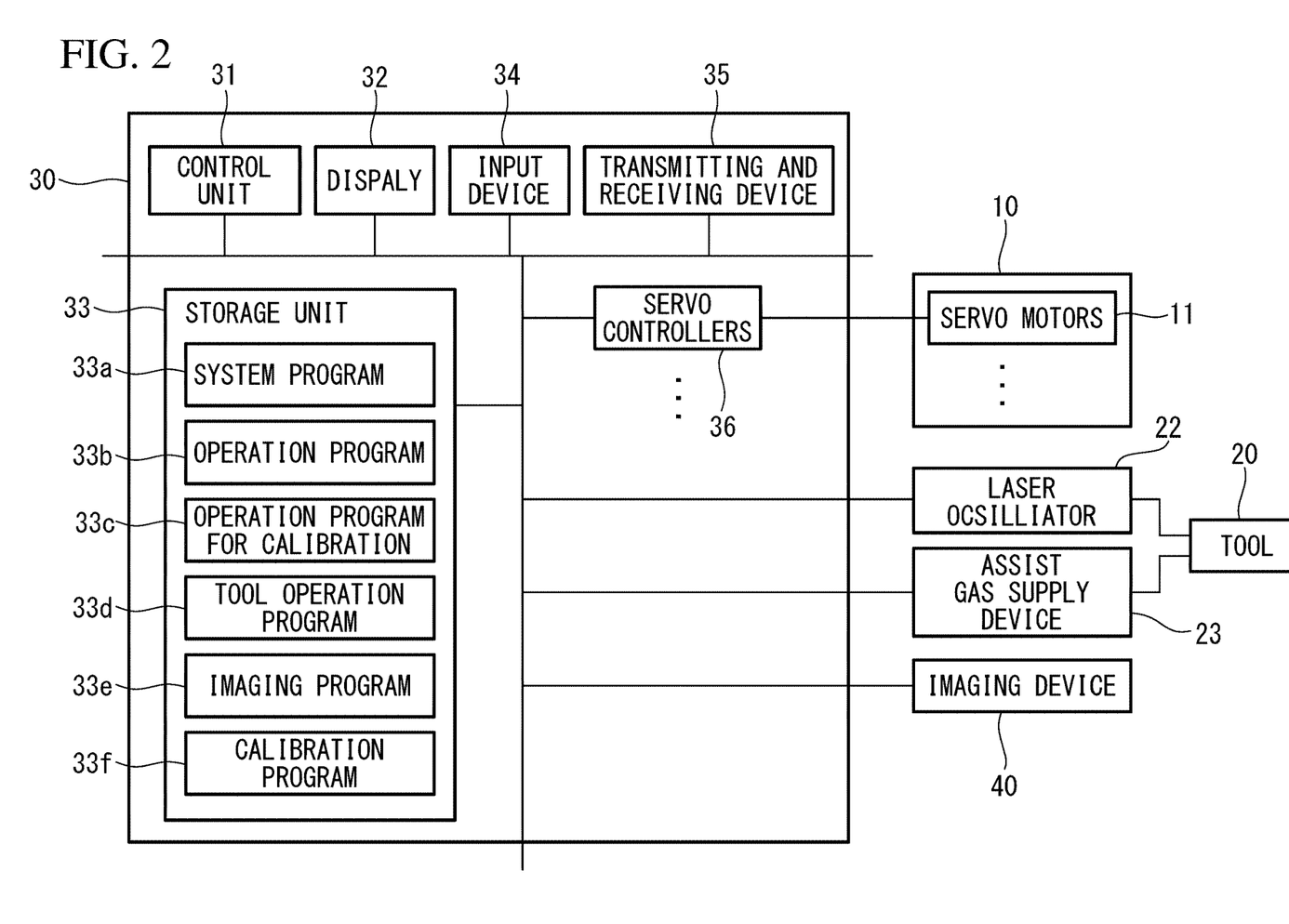
FIG. 2 is a block diagram of a controller of the robot system of the embodiment.

In this embodiment, the tool 20 is a laser welding tool which irradiates laser beam so as to perform laser welding, a laser processing tool which performs laser cutting, or the like. In such a case where the tool 20 is the laser welding tool, a nozzle 21 is provided at a distal end of the tool 20, and a through-hole (not shown) which has, for example, a diameter of approximately 1 mm is provided in the nozzle 21. The through-hole extends in a direction along a longitudinal axis line of the tool 20. The tool 20 is connected to a laser oscillator 22 (FIG. 2), and laser beam which is generated from the laser oscillator 22 is irradiated onto a processing object W from the through-hole of the nozzle 21. Also, the tool 20 is connected to an assist gas supply device 23 (FIG. 2). Assist gas is supplied to the tool 20 from the assist gas supply device 23, and the assist gas is made to blow on the processing object W via the through-hole of the nozzle 21 or a hole for the assist gas. In order to cut the processing object W, the laser beam is irradiated to the processing object W and the assist gas is made to blow on the processing object W. Also, the tool 20 may be a laser processing tool which performs other processing.

The robot 10 includes a plurality of arm members and a plurality of joints. And, the robot 10 includes a plurality of servo motors 11 which respectively drive the plurality of joints (refer to FIG. 2). As the servo motors 11, a various kinds of servo motors, such as a rotary motor, a linear motor, and the like may be used. Each of the servo motors 11 has an operation position detection device which detects an operation position and operation speed of each of the servo motors 11, and one example of the operation position detection device is an encoder. Detected values of the operation position detection devices are sent to the controller 30.

As shown in FIG. 2, the controller 30 includes a control unit 31 having a processor and the like, a display 32, a storage unit 33 having a non-volatile storage, a ROM, a RAM, and the like, an input device 34 which is a teach pendant and the like, a transmitting and receiving device 35 for transmitting and receiving signals, and servo controllers 36 which are respectively connected to the servo motors 21. The input device 34 and the transmitting and receiving device 35 function as an input unit.

As shown in FIG. 2, the controller 30 is connected to the laser oscillator 22 and the assist gas supply device 23. On the basis of an operation program 33b which is described below, the controller 30 controls the laser oscillator 22 and the assist gas supply device 23 so as to cut the object W.

A system program 33a is stored in the storage unit 33, and the system program 33a provides a basic function of the controller 30. Also, an operation program 33b is stored in the storage unit 33. The control unit 31 reads the operation program 33b, and controls the servo controllers 36, the laser oscillator 22, and the assist gas supply device 23 on the basis of the operation program 33b. By this, the robot 10 moves a tool 40 along a processing locus PL, which is shown in FIG. 1, for example, so that the processing object W is cut along the processing locus PL.

An operation program for calibration 33c, a tool operation program 33d, an imaging program 33e, and a calibration program 33f are stored in the storage unit 33.

Due to distortion of a lens of the imaging device 40 and the like, a position of an article and the like in the images captured by the imaging device 40 may be different from an actual position. In order to correct such difference, conventionally, a plate-like jig having a plurality of dots painted on its surface is fixed to a predetermined position, and images of the dots on the fixed jig are captured by the imaging device 40. And, correction data is created (calibration) on the basis of difference between positions of the plurality of dots in the images captured by the imaging device 40 and positions where the dots are supposed to be placed (predetermined reference positions). This correction data is used in order to correct the images captured by the imaging device 40.

Figure 3:
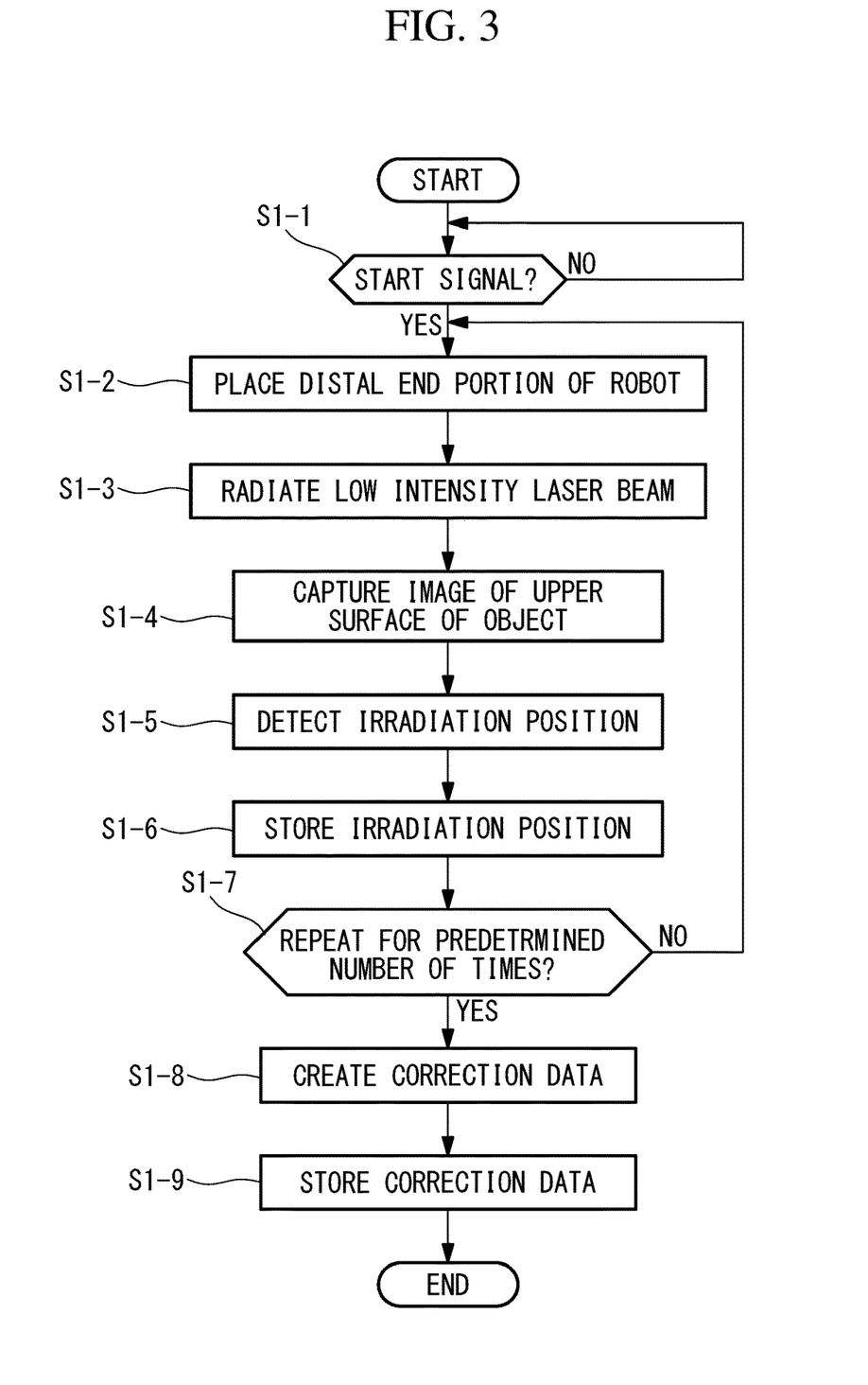
FIG. 3 is a flowchart showing an example of processing of the controller of the embodiment.

On the other hand, in this embodiment, the control unit 31 performs the below described calibration on the basis of the operation program for calibration 33c, the tool operation program 33d, the imaging program 33e, and the calibration program 33f. Processing of the control unit 31 at the time of performing the calibration is shown in the flowchart of FIG. 3.

At first, when the control unit 31 receives a start signal which is input by using the input device 34, the transmitting and receiving device 35, and the like (Step S1-1), on the basis of the operation program for calibration 33c, the control unit 31 places the distal end portion of the robot 10 at one of a plurality of calibration positions (Step S1-2). Also, on the basis of the tool operation program 33d, the control unit 31 causes the tool 20 to radiate laser beam of which intensity is lower than that used for predetermined laser processing such as cutting processing and the like when the distal end portion of the robot 10 is placed at the calibration position in Step S1-2 (Step S1-3). The laser beam which is irradiated in Step S1-3 has an intensity of few percent of the intensity of the laser beam which is used for the laser processing, and the intensity of less than 5% is desirable.

In this embodiment, the tool 40 which is attached at the distal end portion of the robot 10 irradiates the laser beam in a diagonally downward direction at each of the calibration positions. For example, when the upper surface of the object W extends in a horizontal direction, the laser beam and the upper surface of the object W form an angle of 80 degrees. Also, the laser beam and the upper surface of the object W may form an angle of 90 degrees, and may form any other angle.

Also, on the basis of the imaging program 33e, the control unit 31 uses the imaging device 40 so as to capture images of the upper surface of the object W in a state where the low intensity laser beam is being radiated from the tool 20 (Step S1-4).

Also, on the basis of the imaging program 33e, the control unit 31 performs known image processing such as binarization processing, machining processing, and the like on the image captured by the imaging device 40, and by this, the control unit 31 detects irradiation position of the low intensity laser beam on the upper surface of the object W in each of the images (Step S1-5), and the control unit 31 stores the detected irradiation position so as to be associated with the position of the distal end portion of the robot 10 and the like in the storage unit 33 (Step S1-6). The position of the distal end portion of the robot 10 may be a position which is calculated from detected values of the operation position detection devices, and it may also be a position which is intended by the operation program for calibration 33c.

The control unit 31 repeatedly performs Steps S1-2 to S1-6 for a predetermined number of times (Step S1-7). Also, in Step S1-2, the distal end portion of the robot 10 is sequentially positioned at the plurality of calibration positions. After Steps S1-2 to S1-6 have repeatedly performed for the predetermined number of times (Step S1-7), on the basis of the calibration program 33f, the control unit 31 creates the correction data, as the calibration, on the basis of the difference between each of the irradiation positions, which are stored in the storage unit 33, and each of the positions where the irradiation positions are supposed to be placed in the images (the predetermined reference positions) (Step S1-8), and stores the created correction data in the storage unit 33 (Step S1-9). The correction data is data which corrects distortion occurred due to aberration of the lens of the imaging device 40 and the like, such as distortion seen in the image of end portion sides of the field of view of the imaging device 40. That is to say, by correcting the images captured by the imaging device 40 by using the correction data, the distortion disappears or the distortion is suppressed in images after correction.

Figure 4:
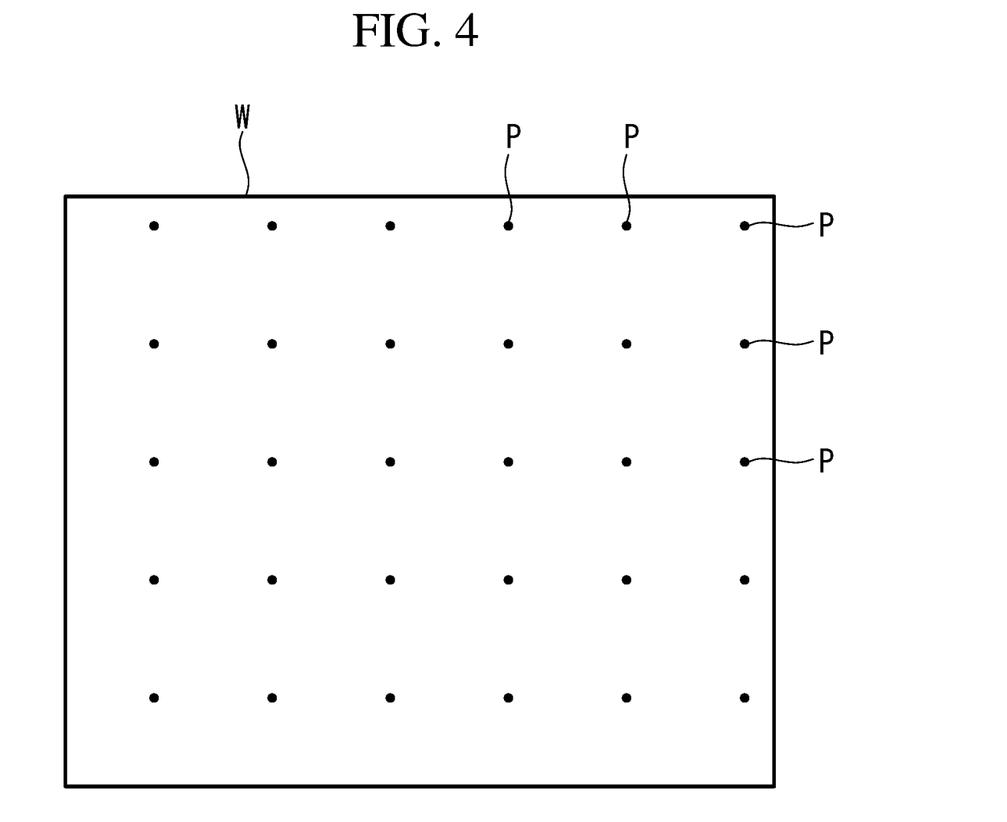
FIG. 4 is a diagram showing an example of irradiation points of the embodiment.

In one example, as shown in FIG. 4, the low intensity laser beam is irradiated onto a plurality of irradiation points P which are on the upper surface of the object W by the operation program for calibration 33c and the tool operation program 33d. That is to say, each of the positions of the irradiation points P, relative positional relationship between the irradiation positions P, and the like are known. On the basis of the positions of the irradiation points P and the relative positional relationship of the irradiation points P, which are known, it is possible to obtain the positions where the irradiation points P are supposed to be placed.

Figure 5:
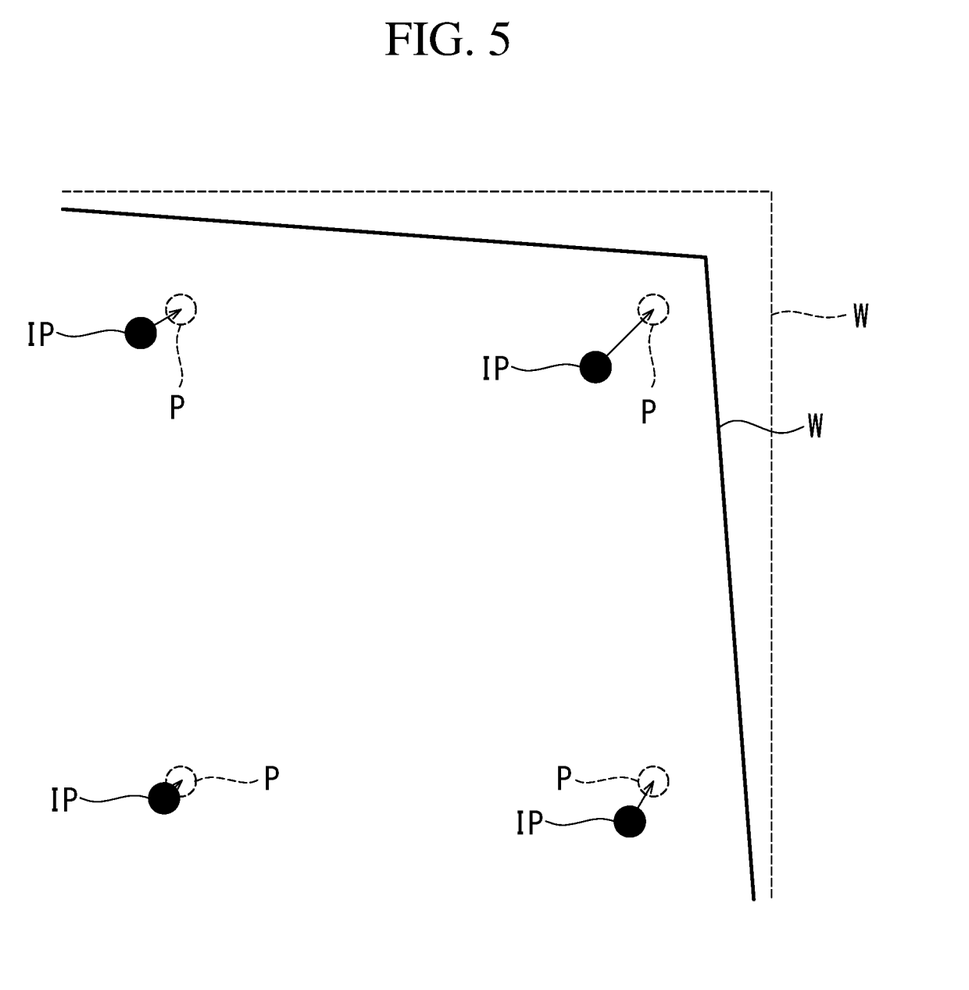
FIG. 5 is a diagram showing an example of detected irradiation positions of the embodiment.

The irradiation positions of the low intensity laser beam which is irradiated as described above is, for example, detected by the imaging program 33e as shown in FIG. 5. In FIG. 5, a shape that the object W is supposed to be and positions where the irradiation points P are supposed to be placed are shown in a broken line, and the detected irradiation positions IP are shown in a solid line. And, the end portion of the object W where the aberration of the lens is likely to occur is drawn in FIG. 5.

The correction data matches each of the irradiation positions IP, which are shown in FIG. 5, to each of the irradiation points P. The control unit 31 also obtains interpolation correction data between the irradiation points P in the images by a known interpolation, and the obtained interpolation correction data is stored in the storage unit 33 as the correction data. The correction data is based on the difference between the irradiation positions and the positions where the irradiation positions are supposed to be placed, and the correction data eliminates or reduces this difference.

Figure 6:
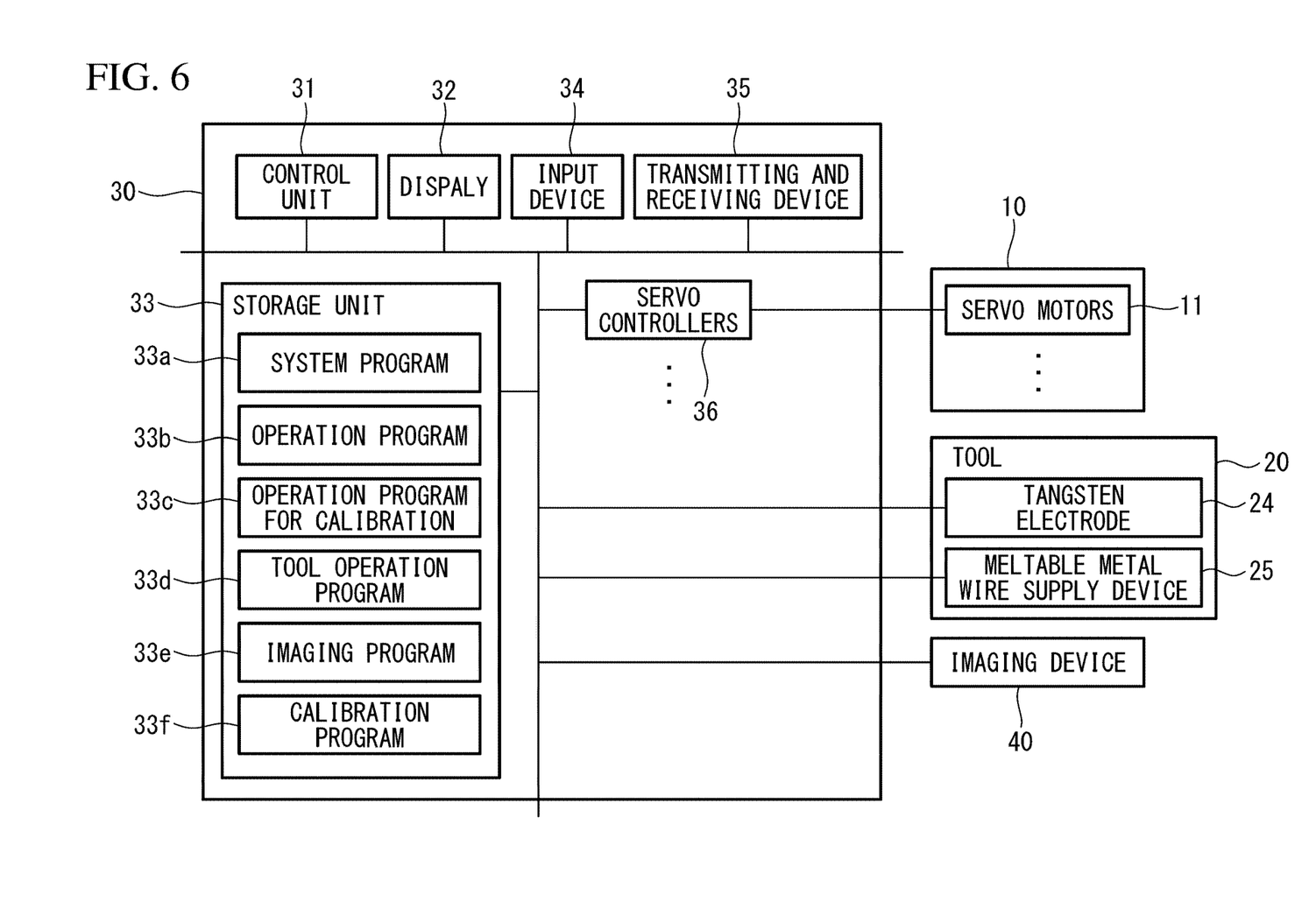
FIG. 6 is a block diagram of a controller of a robot system according to a second embodiment of the present invention.
Figure 7:
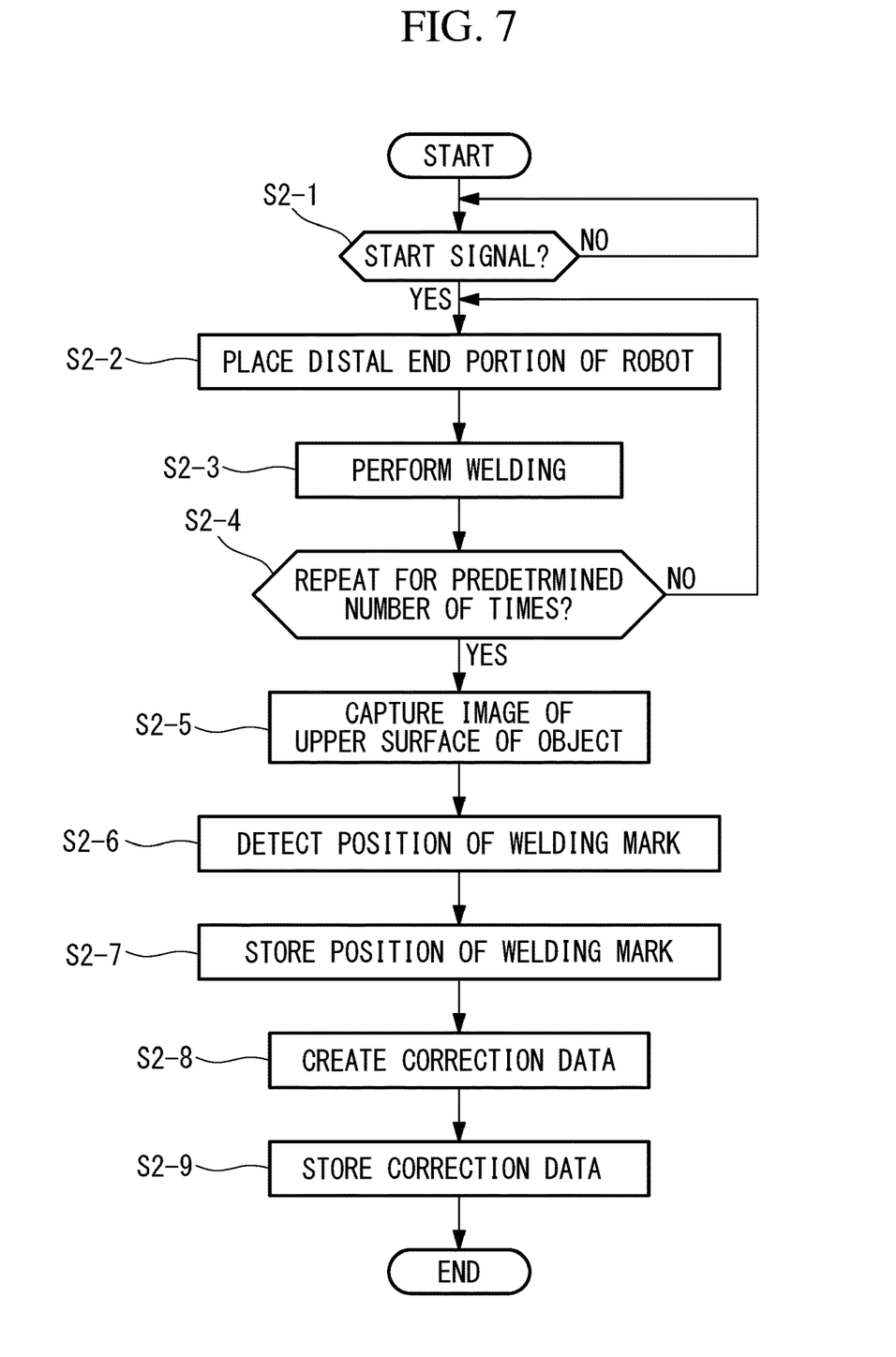
FIG. 7 is a flowchart showing an example of processing of the controller of the second embodiment.

A robot system according to a second embodiment of the present invention will be described below with reference to FIG. 6 to FIG. 8.

The second embodiment is different from the first embodiment in that the tool 20 is an arc welding tool. The configurations which are the same as or similar to those in the first embodiment are assigned the same reference symbols and their explanation is omitted.

The tool 20 includes a tungsten electrode 24 and a meltable metal wire supply device 25 (FIG. 6), and the control unit 31 of the controller 30 controls the servo controllers 36, the tungsten electrode 24, and the meltable metal wire supply device 25 on the basis of the operation program 33b, and by this, the welding processing with respect to the object W is performed.

In the second embodiment also, the calibration which is described below is performed. Processing of the control unit 31 at the time of performing the calibration of the second embodiment is shown in FIG. 7.

At first, when the control unit 31 receives the start signal which is input by using the input device 34, the transmitting and receiving device 35, and the like (Step S2-1), on the basis of the operation program for calibration 33c, the control unit 31 places the distal end portion of the robot 10 at one of the plurality of calibration positions (Step S2-2). Also, on the basis of the tool operation program 33d, the control unit 31 controls the tungsten electrode 24 and the meltable metal wire supply device 25 of the tool 20 so that the tool 20 is caused to perform the welding when the distal end portion of the robot 10 is placed at the calibration position in Step S2-2 (Step S2-3).

The control unit 31 repeatedly performs Steps S2-2 to S2-3 for a predetermined number of times (Step S2-4). Also, in Step S2-2, the distal end portion of the robot 10 is sequentially positioned at the plurality of calibration positions. After Steps S2-2 to S2-3 have repeatedly been performed for the predetermined number of times (Step S2-4), the control unit 31 uses the imaging device 40 so as to capture the images of the upper surface of the object W on the basis of the imaging program 33e (Step S2-5).

Also, on the basis of the imaging program 33e, the control unit 31 performs known image processing such as the binarization processing, the machining processing, and the like on the images captured by the imaging device 40, and by this, the control unit 31 detects positions of the welding marks (traces), respectively, on the upper surface of the object W in the obtained images (Step S2-6), and stores the detected positions of the welding marks in the storage unit 33 (Step S2-7).

Also, similar to the first embodiment, every time the welding is performed in Steps S2-2 and S2-3, it may be possible to perform processing which captures images by using the imaging device 40, and processing which stores the detected positions of the welding marks the captured images so as to be associated with the positions and the likes of the distal end portion of the robot 10 in Step S2-2.

Next, on the basis of the calibration program 33f, the control unit 31 creates correction data, which plays the role of the calibration, on the basis of differences between the positions of the welding marks, which are stored in the storage unit 33, and the positions where the welding marks are supposed to be positioned in the images (predetermined reference positions) (Step S2-8), and the control unit 31 stores the created correction data in the storage unit 33 (Step S2-9).

In one example, the welding marks are formed in a grid pattern on the upper surface of the object W due to the operation program for calibration 33c and the tool operation program 33d. That is to say, each of the positions of the plurality of welding marks, positional relationship between the welding marks with each other, and the like are known. On the basis of the positions of the welding marks and the positional relationship between the welding marks with each other, which are known, it is possible to obtain positions where the welding marks are supposed to be placed.

Figure 8:
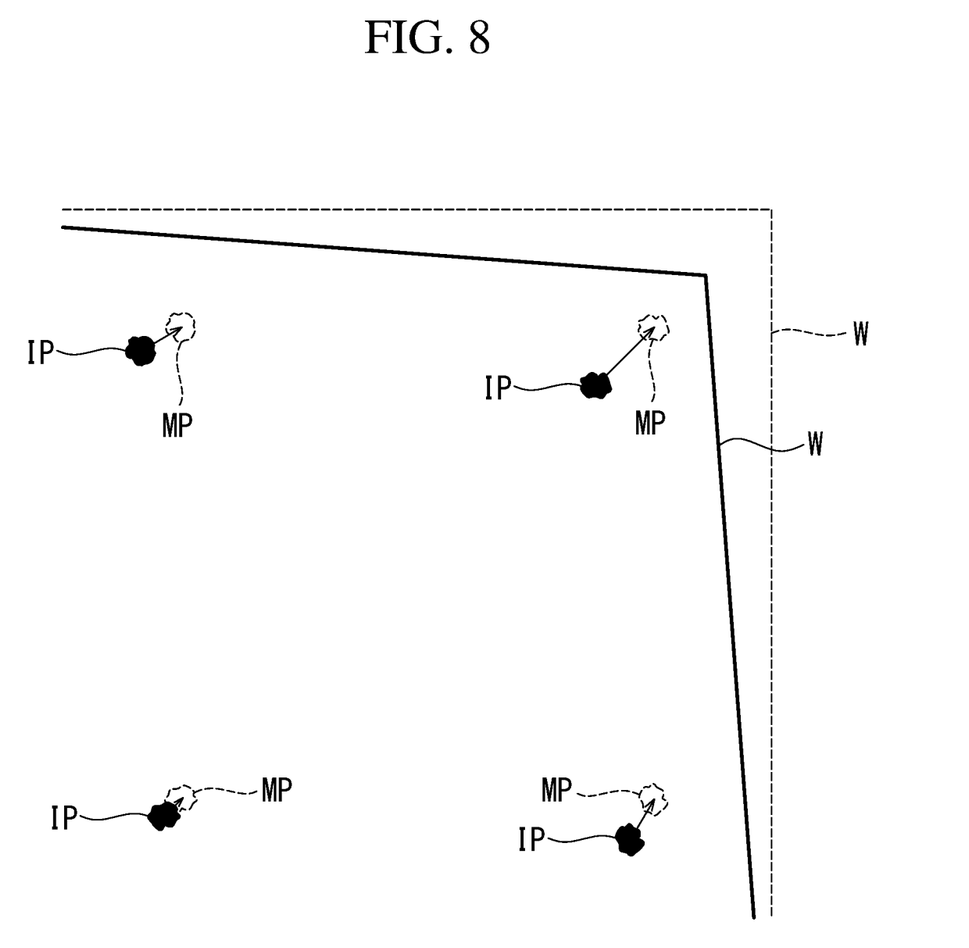
FIG. 8 is a diagram showing an example of detected positions of welding marks.

The positions of the welding marks MP which are irradiated as described above is, for example, detected by the imaging program 33e as shown in FIG. 8. In FIG. 8, a shape in which the object W is supposed to be and positions where the welding marks MP are supposed to be placed are shown in a broken line, and the detected positions of the welding marks MP are shown in a solid line. And, FIG. 8 shows the end portion of the object W where the aberration of the lens of the imaging device 40 is likely to occur.

Also, in the second embodiment, the tool 20 may be a dispenser tool which applies a sealing agent. In this case, the controller 30 controls the robot 10 and the tool 20 so as to perform work which applies the sealing agent to the object W. Moreover, in Step S2-3, the control unit 31 controls the tool 20 so as to cause the tool 20 to apply the sealing agent. It is preferable that the sealing agent at this time is applied in a dot shape.

And, in Step S2-6, the control unit 31 detects positions of the application portions (traces) in each of which the sealing agent is applied on the upper surface of the object W, and in Step S2-7, the control unit 31 stores the detected positions of the application portions in the storage unit 33. Also, in Step S2-8, the control unit 31 creates the correction data, which plays the role of the calibration, on the basis of differences between the positions of the application portions, which are stored in the storage unit 33, and the positions where the application portions are supposed to be placed in the images.

In the second embodiment, the tool 20 may be a laser processing tool which performs the laser processing. In this case, in Step S2-3, the control unit 31 controls the tool 20 so as to cause the tool 20 to perform the laser processing. It is preferable that the traces of the laser processing at this time is in a dot shape.

And, in Step S2-6, the control unit 31 detects the positions of the traces of the laser processing on the upper surface of the object W, and in Step S2-7, the control unit 31 stores the detected positions of the traces in the storage unit 33. Also, in Step S2-8, the control unit 31 creates the correction data as the role of the calibration on the basis of differences between the positions of the traces, which are stored in the storage unit 33, and the positions where the traces are supposed to be placed in the images.

Also, in each of the above described embodiments, it is possible to perform calibration (modification) for the robot 10 or for the operation program 33b. This calibration is performed in a state where the calibration of the aberration of the lens of the imaging device 40 and the like has already been performed in Steps S1-8, S1-9, S-2-8, and S2-9, for example, and where an influence of the distortion of the lens can be eliminated from the images captured by the imaging device 40.

For example, on the basis of the operation program 33b, the control unit 31 controls the robot 10 and the tool 20, and at this time, the control unit 31 causes the tool 20 to irradiate the low intensity laser beam so that the control unit 31 can detect the position, a locus, and the like of the laser beam by using the images captured by the imaging device 40. And, the control unit 31, an operator, and the like can perform the calibration of the robot 10 or the operation program 33b by using the position, the locus, and the like of the laser beam which are detected.

In one example, in response to rigidity of the robot 10, internal mass of the robot 10, internal mass of the tool 20, operation speed of the robot 10, orientation of the robot 10, and the like, there may be a case where the distal end portion of the robot 10 vibrates during the operation of the robot 10, which is on the basis of the operation program 33b. When the laser processing, such as cutting processing using the laser beam, is performed in a state where the distal end portion of the robot 10 is shaking, quality of a processing portion is degraded. And therefore, the calibration of the robot 10 or the calibration of the operation program 33b may be performed in order to improve the quality of the processing portion.

Also, each of the above described embodiments shows that the irradiation of the laser beam, the welding, or the application of the sealing agent is performed with respect to the object W, which is a plate-like work, however, anything can be used as the object W. For example, the object W may be a frame of a bicycle, a various kinds of jigs, an upper surface of a transportation device, a floor surface of the transportation device, and the like.

In this embodiment, the controller 30 is a robot controller which controls the operation of the robot 10, however, the controller 30 may be other controller having the configuration which is described in the embodiment. For example, the controller 30 may be another controller or a host controller, which is connected to the robot 10. In this case, the other controller or the host controller stores at least one of the operation program for the calibration 33c, the tool operation program 33d, the imaging program 33e, and the calibration program 33f, and the other controller or the host controller performs the above processing on the basis of the stored program.

And, in each of the above described embodiments, the imaging device 40 may be attached at the distal end portion and the like of the robot 10. In this case also, the imaging device 40 captures the images of the upper surface of the object W having the welding marks, the application portions of the sealing agent, and the like, and processing which is the same as or similar to the above described processing is performed.

In each of the above described embodiments, when the distal end portion of the robot 10 is placed at each of calibration positions, the laser beam is irradiated to the object W or the traces are formed on the object W due to the operation of the tool 20, and the calibration is performed on the basis of comparison between the irradiation positions of the laser beam or the positions of the traces, which are in the images captured by the imaging device 40, and predetermined reference positions. And therefore, for example, it is not necessary to prepare a calibration jig on which marks are positioned in a grid pattern. And, since it is also possible to use a work which is a work target as the object W, the calibration can accurately be performed on the imaging device 40 with respect to the operation positions. It is also possible to perform the calibration intensively on a surrounding of the operation positions.

Also, in some of the above described embodiments, the tool 20 is the laser processing tool which performs predetermined laser processing by irradiating the laser beam, and in order to perform the calibration, the control unit 31 causes the tool 20 to irradiate the laser beam of which intensity is lower than that used for the laser processing.

With this configuration, the tool 20 irradiates the laser beam of which intensity is lower than that used for the laser processing. And therefore, in such a case where the object W is a work which is a target of the laser processing, it is possible to perform actual laser processing on the work after performing the calibration by using the work. In this case, the calibration is accurately performed on the object on which the laser processing is performed.

Also, in one of the above described embodiments, the tool 20 is the arc welding tool which performs the arc welding, and the control unit 31 causes the tool 20 to perform the arc welding in order to perform the calibration.

With this configuration, in such a case where the object W is a work which is a target of the arc welding, the calibration is accurately performed on the object on which the arc welding is performed.

Also, in one of the above described embodiments, the tool 20 is the dispenser tool which applies the sealing agent, and the control unit 31 causes the tool 20 to apply the sealing agent in order to perform the calibration.

With this configuration, in such a case where the object W is a work which is an application target of the sealing agent, the calibration is accurately performed on the object to which the sealing agent is applied.

The following aspects of the present invention are derived from the above disclosure.

A robot system according to a first aspect of the present invention includes a robot; a tool which is attached to a distal end portion of the robot; an imaging device which is attached to the robot or a predetermined support portion; and a controller which controls the robot and the tool; wherein, the controller performs: operation processing for calibration which arranges the distal end portion of the robot at a plurality of calibration positions; tool operation processing which operates the tool at each of the plurality of the calibration positions, imaging processing which causes the imaging device to capture light irradiated to a predetermined object or a trace left on the predetermined object in the tool operation processing, and, calibration processing which performs calibration based on comparison between irradiation positions of the light or positions of the traces, which are in an image captured by the imaging device, and predetermined reference positions.

With the first aspect, when the distal end portion of the robot is placed at each of the calibration positions, the light is irradiated to the object or the trace is formed on the object due to the operation of the tool, and the calibration is performed on the basis of the comparison between the irradiation positions of the light or the positions of the traces, which are in the images captured by the imaging device, and the predetermined reference positions. Therefore, it is not necessary to prepare a dedicated calibration jig on which marks are positioned in a grid pattern, for example. Also, since it is also possible to use a work which is a work target as the object, it is possible to accurately perform the calibration on the imaging device with respect to the operation position. It is also possible to perform the calibration precisely on a surrounding of the operation position.

In the above aspect, preferably, the tool is a laser processing tool which performs predetermined laser processing by radiating laser beam, and the controller causes, in the tool operation processing, the tool to radiate the laser beam whose intensity is lower than that used for the predetermined laser processing.

With this aspect, the tool irradiates the laser beam whose intensity is lower than that used for the laser processing. And therefore, in such a case where the object is a work which is a target of the laser processing, it is possible to perform actual laser processing on the work after performing the calibration by using the work. In this case, the calibration is accurately performed on the object which is to be laser processed.

In order to reduce or eliminate damage of the object, it is preferable that the laser beam whose intensity is lower than that used for the predetermined laser processing is laser beam having an intensity with that the predetermined laser processing object is not processed.

In the above aspect, preferably, the tool is an arc welding tool which performs arc welding, and the controller causes the tool to perform the arc welding in the tool operation processing.

With this aspect, in such a case where the object is a work which is a target of the arc welding, the calibration is accurately performed on the target of the arc welding.

In the above aspect, preferably, the tool is a dispenser tool which applies a sealing agent, and the controller causes the tool to apply the sealing agent in the tool operation processing.

With this aspect, in such a case where the object is a work which is an application target of the sealing agent, the calibration is accurately performed on the application target of the sealing agent.

A calibration method according to a second aspect of the present invention includes a calibration arrangement step which places a distal end portion of a robot, at which a tool is provided, at a plurality of calibration positions; a tool operation step which operates the tool at each of the plurality of the calibration positions; an imaging step which causes an imaging device to capture light irradiated to a predetermined object or a trace left on the predetermined object due to the tool operation step; and, a calibration step which performs calibration based on comparison between irradiation positions of the light or positions of the traces, which are in an image captured by the imaging device, and predetermined reference positions.

A calibration method according to a third aspect of the present invention includes a calibration arrangement step which places a distal end portion of a robot, at which a laser processing tool for performing a predetermined laser processing is attached, at a plurality of calibration positions; a tool operation step which causes the laser processing tool, at each of the plurality of the calibration positions, to radiate laser beam whose intensity is lower than that used for the predetermined laser processing; an imaging step which causes an imaging device to capture an image of the laser beam irradiated to a predetermined object due to the tool operation step; and a calibration step which performs calibration based on comparison between irradiation positions of the laser beam in the image captured by the imaging device and predetermined reference positions.

According to the above aspects, it is possible to reduce effort which is required for adjusting a robot system including an imaging device, and it is possible to accurately perform calibration of the imaging device.

REFERENCE SIGNS LIST 10 robot
20 tool
21 nozzle
22 laser oscillator
23 assist gas supply device
24 tungsten electrode
25 meltable metal wire supply device
30 controller
31 control unit
32 display
33 storage unit
33a system program
33b operation program
33c operation program for calibration
33d tool operation program
33e imaging program
33f calibration program
34 input device
35 transmitting and receiving device
36 servo controllers
40 imaging device
W object
PL processing locus
IP detected irradiation position or detected position of welding mark
P irradiation point
MP positions of welding marks

The invention claimed is:

1. A robot system comprising:
a robot;
a tool which is attached to a distal end portion of the robot;
an imaging device which is attached to the robot or a predetermined support portion; and
a controller which controls the robot and the tool;
wherein the controller performs:
operation processing for calibration which arranges the distal end portion of the robot at a plurality of calibration positions;
tool operation processing which operates the tool at each of the plurality of the calibration positions relative to a predetermined object to be processed;
imaging processing which causes the imaging device to capture images of one of
a position of a trace on an upper surface of the predetermined object in the tool operation processing; and
calibration processing which performs calibration using a comparison between a position of the trace detected from the images captured by the imaging device and predetermined reference positions, wherein the predetermined reference positions comprise actual positions where the trace is supposed to be positioned in the captured images.

2. The robot system according to claim 1, wherein:
the tool is a laser processing tool which performs predetermined laser processing by radiating laser beam; and the controller causes, in the tool operation processing, the tool to radiate the laser beam whose intensity is lower than that used for the predetermined laser processing.

3. The robot system according to claim 1, wherein:
the tool is an arc welding tool which performs arc welding; and
the controller causes the tool to perform the arc welding in the tool operation processing.

4. The robot system according to claim 1, wherein:
the tool is a dispenser tool which applies a sealing agent; and
the controller causes the tool to apply the sealing agent in the tool operation processing.

5. A calibration method comprising:
a calibration arrangement step which places a distal end portion of a robot, at which a tool is provided, at a plurality of calibration positions;
a tool operation step which operates the tool at each of the plurality of the calibration positions relative to a predetermined object to be laser processed;
an imaging step which causes an imaging device to capture images of one of
 a position of a trace on an upper surface of the predetermined object due to the tool operation step; and
a calibration step which performs calibration using a comparison between a position of the trace detected from the images captured by the imaging device and predetermined reference positions, wherein the predetermined reference positions comprise actual positions where the trace is supposed to be positioned in the captured images.

6. A calibration method comprising;
a calibration arrangement step which places a distal end portion of a robot, at which a laser processing tool for performing a predetermined laser processing is attached, at a plurality of calibration positions;
a tool operation step which causes the laser processing tool, at each of the plurality of the calibration positions, to radiate laser beam whose intensity is lower than that used for the predetermined laser processing relative to a predetermined object to be laser processed;
an imaging step which causes an imaging device to capture an image of a position of a trace made on the predetermined object due to the tool operation step; and
a calibration step which performs calibration based on comparison between a position of the trace detected from the image captured by the imaging device and predetermined reference positions, wherein the predetermined reference positions comprise actual positions where the trace is supposed to be positioned in the captured image.

* * * * *